Jan. 14, 1941.  C. BIRDSEYE  2,229,000
REFRIGERATING APPARATUS
Filed March 29, 1939  7 Sheets-Sheet 3

INVENTOR
Clarence Birdseye
BY Kenway & Witter
ATTORNEYS

Jan. 14, 1941.                C. BIRDSEYE                2,229,000
                        REFRIGERATING APPARATUS
                      Filed March 29, 1939        7 Sheets-Sheet 4

INVENTOR
Clarence Birdseye
BY
ATTORNEYS

Jan. 14, 1941.  C. BIRDSEYE  2,229,000
REFRIGERATING APPARATUS
Filed March 29, 1939   7 Sheets-Sheet 6

Inventor:
Clarence Birdseye
by Kenway & Witter
Attorneys

Patented Jan. 14, 1941

2,229,000

UNITED STATES PATENT OFFICE 2,229,000

REFRIGERATING APPARATUS

Clarence Birdseye, Gloucester, Mass., assignor to Mechanical Research, Inc., Providence, R. I., a corporation of Rhode Island Application March 29, 1939, Serial No. 264,793

38 Claims. (Cl. 62—114)

This invention relates to the freezing or quick freezing of solid or liquid food products or combinations of solid and liquid food products. In one aspect the invention comprises an improved freezing apparatus of the multiple plate type, compact in structure, efficient in operation and particularly well adapted for carrying out the process of quick freezing advanced in my copending application Serial No. 260,573, filed March 8, 1939.

My invention solves the problem of freezing moist or moisture-containing food products with the assistance of refrigerated plates over and in direct contact with which the product is moved and to which the product units or the mass of the products naturally tends to stick by freezing. I have solved this problem so completely that in accordance with my new process it is entirely practicable for me to freeze such moist delicate food products as oysters, strawberries, or fresh peas without in any way damaging or mutilating them.

It will be understood that when such products as shucked oysters or shelled green peas are spread upon a sufficiently cold refrigerated plate the surface moisture on the product units at once freezes to the plate, thus attaching the product units firmly to the surface of the plate. I have discovered that by moving a sharp edged member across the refrigerated plate with its edge held continuously substantially in contact with the surface of the plate it is possible to act upon the ice or frost film between the plate and the product units, substantially removing the film from the plate and so separating the product therefrom without the slightest damage. This is true even in the case of oysters, which, on account of their relatively large area, high moisture content and delicate structure, present an extremely difficult problem.

My novel apparatus is therefore characterized by the provision of means for continuously removing from the refrigerated surfaces the frost or ice formed thereon by congelation of moisture from the moist food products or from condensation and congelation of water vapor from the atmosphere surrounding them, and thus freeing the product so that it may be advanced across the refrigerated surface and lifted and turned in the process in order that the whole area of the product may be congealed as early as possible in the freezing process. When that state is reached further movement of the product may be effected easily and without requiring all the precautions necessary in the presence of uncongealed surface moisture.

It is proposed to utilize the sharp edged members not only for freeing the product but for lifting it from the refrigerating surface in limited and progressively advancing areas, thereby forming a wave or a wave crest in the mass of the product. As the product units are lifted in this wave formation they tend to turn and shift positions so that the unfrozen areas of their surfaces are likely to contact with the refrigerating surface when it is next encountered. The wave motion also serves to expose the product units to a refrigerated atmosphere which it is desirable to provide in the spaces between the refrigerated plates and, further, it tends to advance the product intermittently along the refrigerating zone. Still another result of this treatment is continuously to change the positions of the product units with relation to the upper and lower surfaces of the mass of product being frozen, thus reducing the temperature of the whole mass. Another effect of the use of the sharp edged members is to mix fine particles of congealed moisture (from the plates) into the mass of product, from which they absorb heat and to which they have a tendency to adhere in such a way as to prevent the product units so created from sticking to the refrigerated plates. Altogether it will be seen that the wave motion treatment of the product has a multiplicity of important functions all contributing to increase the range and efficiency of my refrigerating process.

While the product is intermittently advanced by the action of the sharp edged member in passing beneath it, I have found it usually desirable to provide additional moving and mixing instrumentalities. For example, the walls defining the freezing zone wherein the product is confined upon one or more of the refrigerating plates may be moved longitudinally or circumferentially, with the result that they tend to carry the mass of the product along with them. If desired, additional product-feeding members, such as drag scrapers, may be provided to travel along the freezing zone and advance and also transversely deflect or spread the product. Various combinations of these instrumentalities for advancing and mixing may be organized with the various refrigerating plates of the series, and various product-moving effects thus realized depending on the requirements of the particular product being treated, as well as its stage of refrigeration.

Experiments have shown that several factors are vital to the success of this kind of quick freezing apparatus, whether it is to be used for freezing liquids or solids, and that the apparatus best suited for freezing comparatively dry products may be somewhat modified in its details if it is to perform equally well on fluids or liquids.

The main purpose of my invention is to quick freeze various types of moist food products, some of which are surface-moist and others, such as crushed fruits, cream or apple cider, are definitely fluid or liquid. Substantially all these food products have a very high water content and are to be distinguished from hard dry products which do not adhere tightly to heat transfer plates and are not injured by rough handling in the apparatus. When a stack of spaced plates is used to freeze moist food products, there arise many problems not heretofore met with in heat exchange processes in which the product is passed along and in direct contact with heat-conductive surfaces.

Such fluids as crushed fruits, broken eggs or cream instantly freeze to the cold plates to form a thin layer of frozen product (frequently having a different specific gravity from the rest of the mass) which must be literally peeled from the plates and mixed with the unfrozen product until the whole mass of fluids has been reduced to the desired temperature. Very watery liquids such as cider adhere to the plates as a thin layer of water ice which must be cut or chipped away from the plates in much the same way as thin layers of ice are sometimes shaved from a large ice cake.

When relatively warm products having a high water content are introduced into this apparatus, deposited on to the cold freezing plates and advanced through the apparatus in such a manner that they are constantly in contact with both metal and air colder than themselves they begin immediately to lose part of their moisture content, and this moisture loss from the product may continue throughout its progress through the apparatus. The loss of moisture from the product takes place by two distinct processes. Some of the surface moisture freezes to the plates, and additional moisture is lost because of the vapor pressure conditions resulting from the fact that the product is constantly surrounded by air or other gas at a temperature considerably lower than that of the product itself. The moisture thus removed from the product may seriously interfere with the satisfactory operation of the apparatus by accumulating on the freezing surfaces of the plates as a gradually increasing layer of ice and by building up an accumulation of frost on the under sides of the freezing plates and other metal surfaces of the apparatus where its presence is highly undesirable. Provision must therefore be made, first, to remove constantly from the freezing zones of the plates, by means of the scraping knives, ice which would otherwise build up upon the plates, and second, to dehydrate the gaseous atmosphere of the apparatus by depositing its moisture content in some part of the apparatus where it cannot hinder operations.

Since it is economically desirable that my apparatus be operated continuously for long periods during which any means of removing moisture from the gaseous atmosphere might become seriously clogged, I propose that means be provided for defrosting the dehydrating means without interfering with the continuous operation of the apparatus. In certain instances I may simultaneously and continuously both dehydrate the atmosphere and discharge from the apparatus the moisture thus removed by employed a circulating liquid refrigerant, such as cold calcium chloride brine, as my dehydrating means.

In order to secure the maximum capacity from the apparatus it is desirable that the freezing plates be at all times covered with the product to a uniform depth and to maintain the product so distributed on each plate of the apparatus from top to bottom. In order that the product may be kept in an even layer over the entire surfaces of the several plates and at the same time be advanced across the plates and through the apparatus at the proper rate, it is desirable that the product flow constantly up and over the scraper blades, simultaneously being advanced just the right distance along the plates to accomplish its journey through the apparatus in the desired time period. It is, of course, necessary further that the product, which is deposited only at one point on the top plate of the machine, shall be taken from that point at such a speed that it will gradually spread the desired thickness of layer over the entire surface of the top plate. To accomplish these necessary results the scraper blades must be of the right shape, number and size and must be operated at the proper speed along the plates. Progress of the product will be positively effected by its contact with the side walls which delineate the freezing zones on the several plates, and to obtain the right product speed, spread and motion it is necessary to coordinate the type of wall (moving or stationary), the blades, the angle at which the blades are set relative to the horizontal and to the diameters of the plates, and the speed of the blades.

In an apparatus of this kind having a large hourly capacity the freezing plates may be several feet in diameter and the freezing zone itself eight inches or more wide. It is somewhat difficult to make such plates perfectly level throughout their entire area or to keep them level under the varying temperature conditions under which they are operated. Yet the blades or other means used to cut the product from the plates and to advance it through the apparatus must at all times be in intimate contact with the plate surfaces, or separated from these surfaces by only a very thin layer of congealed moisture. Accordingly, as herein shown, the blades are self-adjusting for this purpose and provided with yielding means continuously urging their edges toward the flat surface of the plate over which they move.

These and other features of the invention will be best understood and appreciated from the following description of a preferred embodiment of the apparatus or freezing machine and of the manner of practicing the process of my invention in connection therewith.

In the accompanying drawings—

The apparatus as herein illustrated may be cylindrical in shape and includes a base plate 10, a hollow base section 11, and a main section 12 disposed above and carried by the base section 11. The walls of the base and main sections are preferably hollow metallic shells having a filling of cork or other heat insulating material. The main section is closed at its upper end by a metallic cover 13 having an annular insulating plate 14 of the same general insulated construction as the body sections of the apparatus. The cover 13 is provided centrally with bearings 15 for a hollow vertical shaft 50 which will be referred to presently in more detail. The base section 11 is separated from the main section 12 by a horizontally disposed partition 17 having also metallic walls and a filling of insulating material and being supported upon an annular shoulder provided in the inner wall of the base section 11. The partition 17 is centrally apertured for the passage of the shaft 50.

Figure 4:
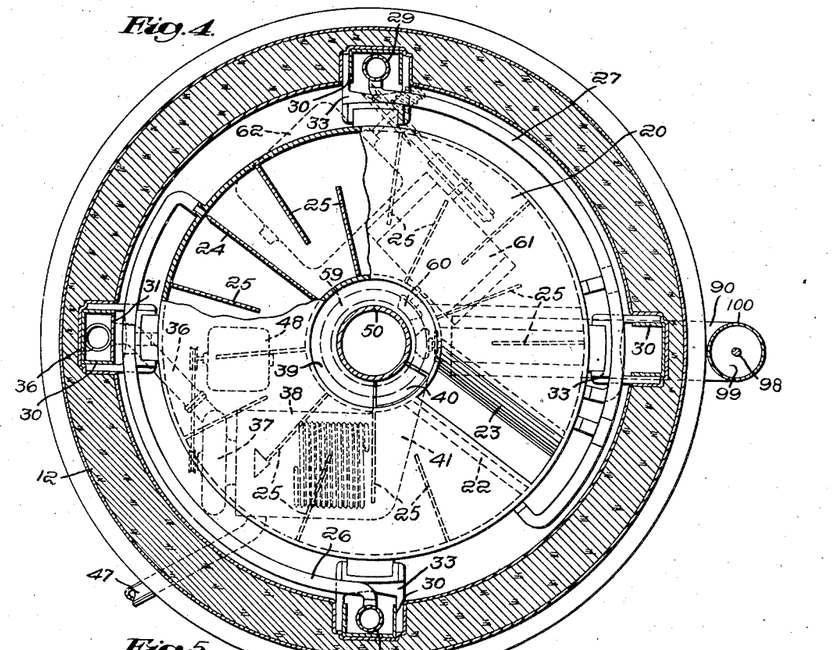
Fig. 4 is a view in cross section on the line 4—4 of Fig. 1.

The base section 11 is provided about its upper edge with a channeled supporting ring 19 which extends circumferentially in inwardly offset relation to the inner walls of the main section 12 and furnishes support for the lowermost refrigerated plate 20 of the series of refrigerated plates or shelves that are arranged within the main section 12 of the apparatus one above another in spaced vertical series. In the illustrated embodiment of the invention, ten of these plates are shown, the seven lower plates of the series being designated by the reference character 20 and the three upper plates of the series being designated by the reference character 21. The seven lower plates 20 are arranged with uniform spacing and the three upper plates 21 are also uniformly spaced but by a greater distance of separation than the plates 20. Each of the plates are annular in outline and hollow or chambered to receive a refrigerant. The chamber in each plate is divided diametrically by a partition 24 and staggered baffles are arranged radially in each chamber as shown in Fig. 4 to direct the refrigerating medium in a circuitous course.

Figures 6, 7, 8:
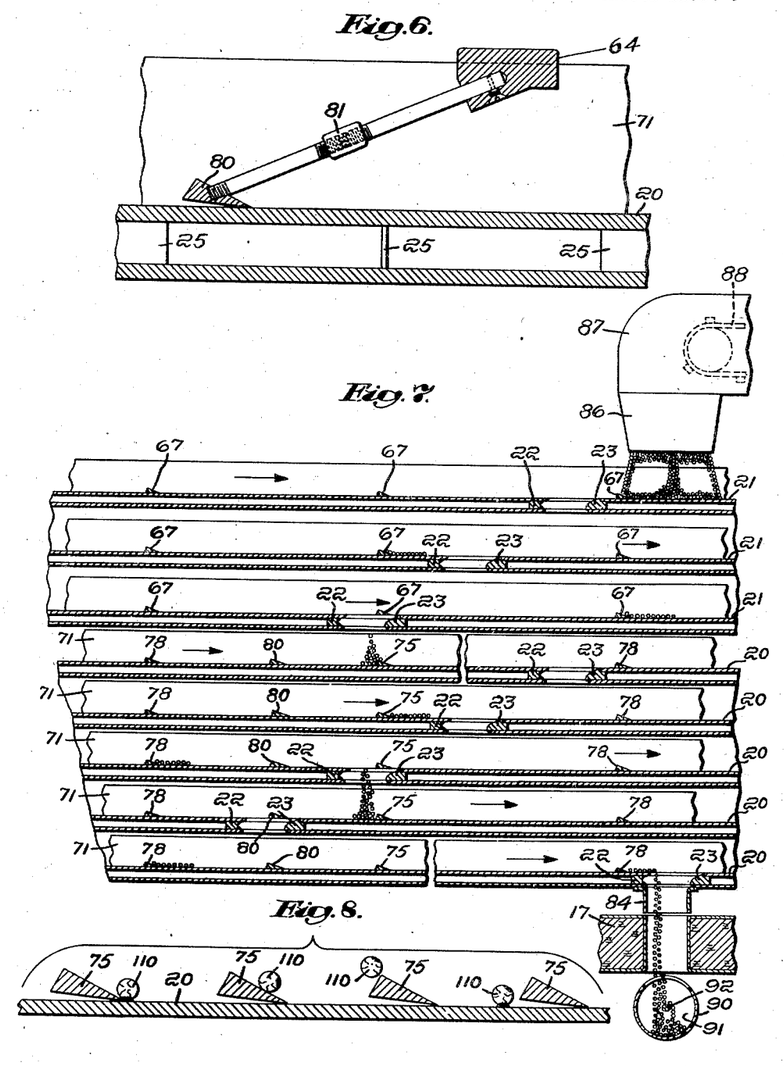
Fig. 6 is a view similar to Fig. 3 showing more especially one of the drag scrapers.
Fig. 7 is a diagrammatic view in cross section illustrating the system of communication between the plates of the apparatus.
Fig. 8 is a diagrammatic view showing progressive position of a unit in respect to a scraper blade.

Each of the plates is provided with an opening through which the product being treated may drop by gravity to the next lower plate. One such opening is shown in some detail in Fig. 3 and the relative arrangement of the openings in the series of plates is shown in Fig. 7. In each plate the opening is radially disposed and the rear wall thereof, that is to say, the wall over which the food product is pushed when it falls to the next lower plate, is formed by a radial filler piece 22 which also serves to close the refrigerating chamber in the plate. The upper wall of the plate 20 is undercut at the rear side of the opening so that the product may drop cleanly from it. The forward wall of the opening is formed by a substantially parallel filler piece 23 which closes the refrigerating chamber of the plate upon its side of the opening and which is provided with a smoothly ascending curved upper surface arranged to engage the scraper blades as they are advanced across the opening and to guide them smoothly up to the level of the plate surface in case they spring downwardly when unsupported in passing across the opening.

The plates 20—21 may be constructed of stainless steel or any other suitable metal, but if a softer metal is used for the body of the plates it is important to provide them with a hard smooth surface. Chrome-plated surfaces have proved very satisfactory in practice.

Figure 1:
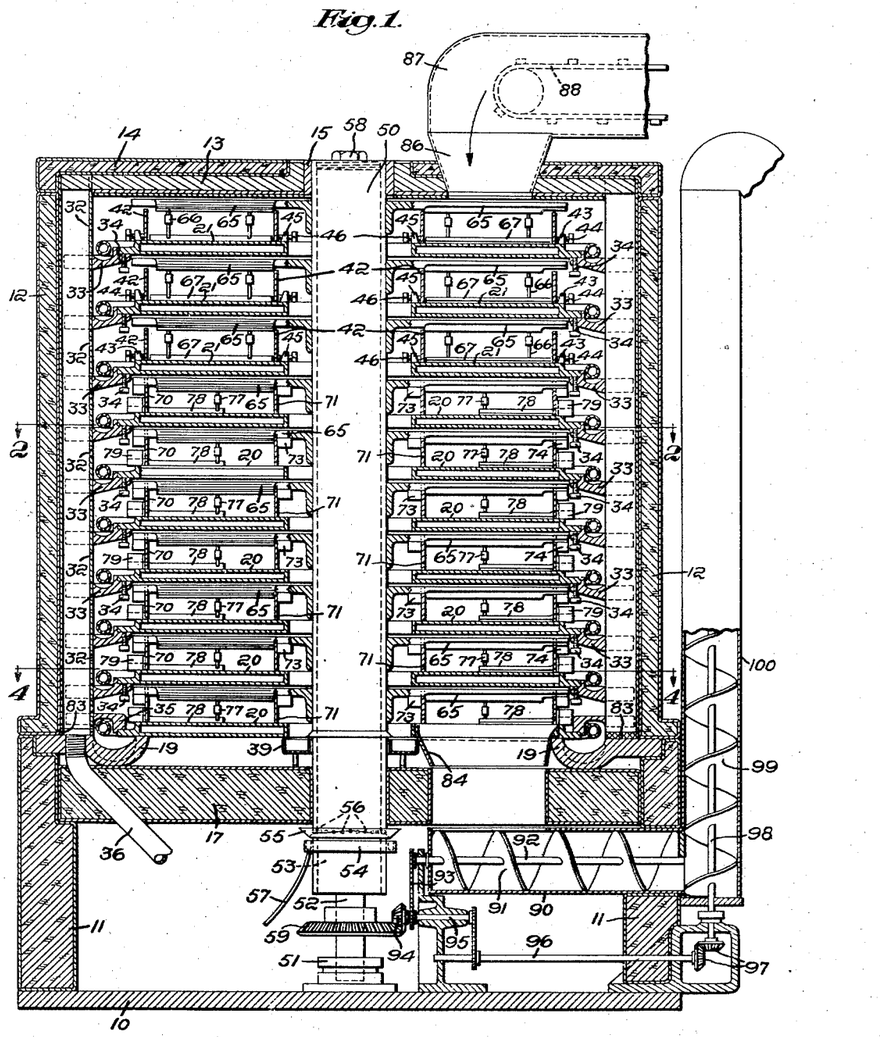
Fig. 1 is a view in vertical section of the apparatus.
Figure 2:
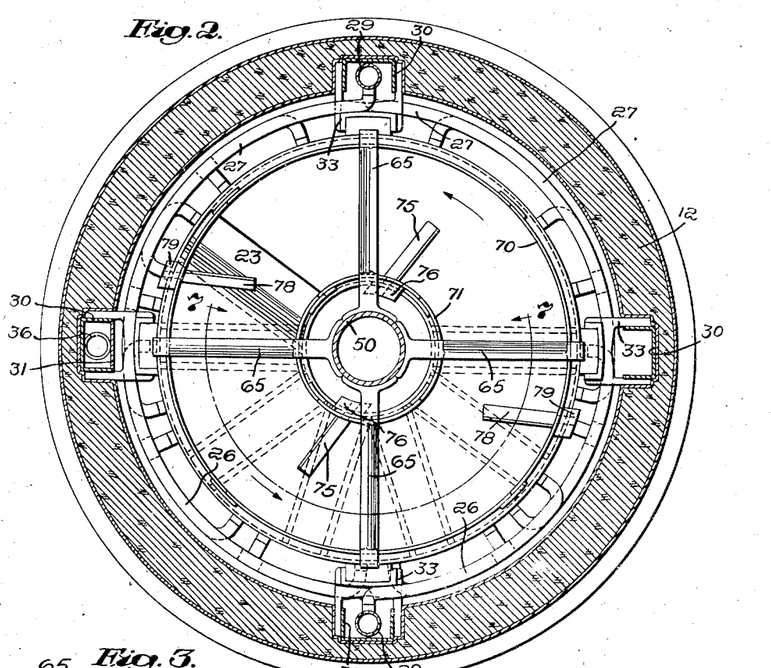
Fig. 2 is a view in cross section on the line 2—2 of Fig. 1

The inner vertical wall of the main section 12 of the apparatus is provided at diametrically opposite points with vertical channels in each of which is located a channel iron 30 disposed so that it opens into the interior of the apparatus and thus provides a vertical channel as well as a rigid supporting element. One of these channel irons, that is to say the one disposed on the left of Figs. 1, 2 and 4, is utilized as an air or vapor duct and for that purpose is provided with a face plate 31 having a series of ports 32 therein which open on a level with the spaces between the plates 20 and 21. All of the channel irons 30 are provided with spaced brackets 33 upon which the plates 20 and 21 above the lower plate of the series are rigidly supported. Each of the brackets 33 is provided with a vertical leveling screw 34 and by manipulating these each plate may be brought accurately into horizontal position independently of every other plate. Each channel iron 30 carries a special clamp 35 which cooperates with the ring 19 to hold the lowermost plate 20 in place.

In one of the channel irons 30, that is to say, the one located toward the front in Figs. 2 and 4, is provided a feed header 28 for the refrigerating medium. This header is connected to the respective plates 20 and 21 by circumferentially disposed feed pipes 26 extending different distances from the header so as to arrange the points of connection with the respective plates in staggered relation as shown in Fig. 2. In the oppositely disposed channel iron 30 is provided a corresponding outlet header 29 and this is similarly connected to the plates 20 and 21 by a series of circumferential outlet pipes 27 also staggered in their points of connection with the respective plates.

Figure 5:
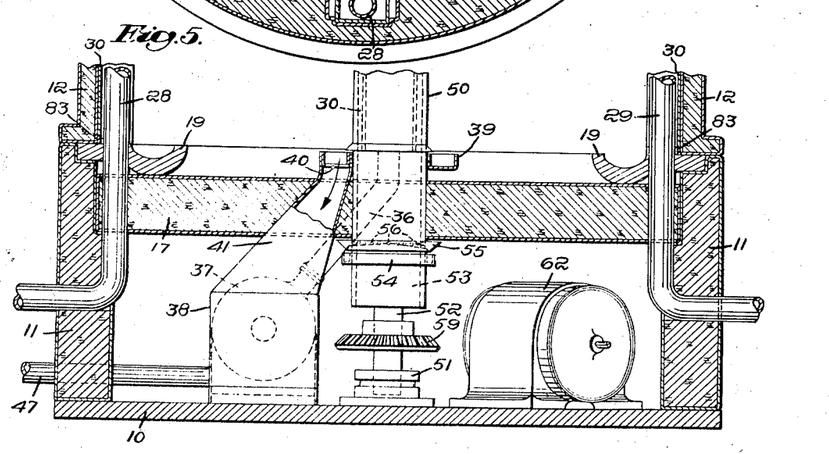
Fig. 5 is a view of the base section of the apparatus in longitudinal section at right angles to that of Fig. 1.

A refrigerating unit 38 including a compressor of any desired commercial design is located in the base section 11 of the apparatus and provided with a fan 37 by which partially dehydrated and refrigerated air or vapor is delivered through an inclined duct 36 to the bottom of the vertical duct formed by the plate 31. The refrigerated air or vapor is thus led up through the vertical duct, passing out through the ports 32 and inwardly across the plates 20—21 and the product supported thereon and then downwardly in the central well which surrounds the shaft 50. Condensation from the descending current of air is collected in an annular drip pan 39 having an opening 40 which communicates with an inclined return duct 41 as shown in Fig. 5. It will be understood that the refrigerating unit 38 is suitably connected, as by the pipe 47, to the feed header 28 and to the outlet header 29 so as to maintain a circulation of refrigerating medium through all the plates. The details of these connections are not fully illustrated since they form specifically no part of the invention, but may be provided by any commercial or usual construction. The base section 11 may also contain a motor 48 (Fig. 4) for operating the refrigerating unit thus making the apparatus complete and self-contained in this respect.

The three upper plates 21 are provided with stationary spaced walls 42 which define the product treating zone thereon. Each of the plates 21 is provided with a series of spaced outer lugs 43 and inner lugs 45. These lugs are provided with corresponding clamping screws 44 and 46 by which the walls 42 are rigidly clamped in fixed position upon the respective plates. These clamping screws form convenient means for adjusting the walls 42 to bring them into desired concentric position upon the plates, and when once adjusted the walls remain in place unless it is desired to remove them for cleaning or inspection. If desired a continuous flange forming a supplemental wall may be substituted for the lugs 43 and 45 and thus provide a circular exterior dam for arresting liquid leakage beneath the walls.

We have now described the stationary parts of the apparatus and will pass to its moving parts. The body of the shaft 50 is of relatively large diameter and is hollow so that it may act as a reservoir for dry ice or other refrigerant if desired. The lower portion 52 of the shaft is solid and rests in a vertical thrust bearing 51 supported by the base plate 10. The lower end of the hollow portion of the shaft 50 is closed by a solid plug 53 and it is surrounded by a circular gutter or drip ring 54 communicating with a waste pipe 57 for disposing of the moisture of condensation. A perforated collar 55 surrounds the shaft 50 just above the drip ring 54 and this is arranged to intercept moisture running down the shaft 50 and to distribute it through ports 56 to the drip ring 54. The shaft 50 is provided at its upper end with a screw plug cover 58 removable to permit the interior of the shaft to be filled with a refrigerant. The shaft 50 is rotated by a large bevelled gear 59 which is secured to its lower solid section 52 and driven through a bevelled pinion 60 shown in Fig. 4 as part of a gear reduction set 61 operated through suitable connection with a motor 62.

The shaft 50 is provided with a series of sets of radial arms 65 corresponding to each of the ten refrigerating plates 20 and 21 and each set shown as comprising four arms. The arms 65 corresponding to the plates 21 are secured to the shaft at a level such that they pass freely above the stationary walls 42, whereas the arms 65 corresponding to the seven lower plates 20 of the series are arranged to interlock and rotate the outer annular walls 70 and the inner annular walls 71 of these plates. The arms 65 associated with the upper plates 21 are each provided with a shallow, sharp edged member acting as a drag scraper 67 and carried by a pair of adjustable turn buckle rods 66. These rods extend at a rearward inclination downwardly from the arms 65 and maintain the forward edge of the scraper continuously in contact with the surface of the refrigerating plates 21. The scraper blades 67 are herein shown as triangular in shape and in any case present inclined faces to the product and engage the surface of the plates only at their advancing edge and in such position as to shave the thin film of ice which is continually formed on the surface of the plate, thus freeing the product from it without in any way mutilating or disfiguring it. In their shape and general arrangement the scrapers 67 are similar to scrapers 75 and 80 which will be presently described in connection with the refrigerating plates 20 and in their movement they generally travel beneath the surface of the mass of product spread upon the plates 20, lifting or wedging from their refrigerating surfaces portions of the product progressively in advancing areas and so forming waves in the product and at the same time causing it to advance in a series of intermittent steps at a slower rate than that of the waves therein.

Figure 3:
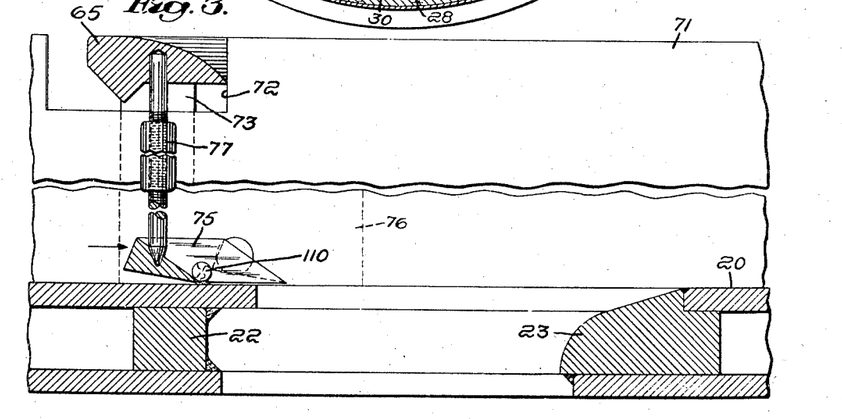
Fig. 3 is a fragmentary view partly in cross section, showing a portion of one plate and the inner wall thereon.

The outer walls 70 and the inner walls 71 associated with the plates 20 are each provided with four notches 72 at diametrically opposite points in its upper edge and into these notches fit the radial arms 65 thus making interlocking driving connections 90° apart between the shaft 50 and the respective walls. Each arm is provided with inner and outer reinforcing blocks 73 and 74 respectively which engage the cylindrical surfaces of the rings and hold them in desired concentric position during their rotation upon the plates. The inner walls 71 of certain plates 20 are provided with a series of scraper blades 75 each of which has at its inner end a cylindrical shank extending through the wall 71 and into a block 76 rigidly secured to the wall. The outer end of each blade 75 may be connected to the arm 65 above it through an adjustable turn buckle rod 77. As shown in Figs. 3 and 6, the inner scraper blades are shallow and triangular in cross section, the heel of the scraper being elevated from the surface of the plate 20, and its thin bevelled edge being maintained in such close contact therewith as to split the ice film between it and the product. For example, in Fig. 3 the blade of the scraper 75 is shown as separating a frozen pea 110 from the plate in this manner. Each scraper blade 75 is set at an angle of substantially 10 degrees behind a radius from its point in intersection with the wall 71 and thus, in being passed through the product on the plate advances obliquely and tends to displace or spread the product outwardly as well as to form an advancing wave therein and to advance the whole mass of the product at a slower rate. The angular relation of this scraper blade is important also since it prevents any tendency to trap the product and carry it around without transverse displacement upon the plate. Instead the product is caused to travel lengthwise of the blade to some extent and toward its free or inner end.

Each scraper blade 75 and 78 is free to rock about the longitudinal axis of its shank and is provided with an arm 68 connected to a tension spring 69 which tends to rock the scraper in a direction to hold its sharp edge always in contact with the plate surface. The bearings for the scrapers also permit a slight rocking movement up and down so that the turn-buckle rod is effective to hold the free end of the scraper down firmly on the plate. A spring loop 82 also tends to rock the scraper downwardly at its free end.

The outer wall 70 is correspondingly provided with four scraper blades 78 which pass through the wall and are similarly mounted in blocks 79 secured to its outer face. The outer scraper blades 78 are identical to the blades 75 in shape but are preferably set at a retreating angle of 20 degrees to a corresponding radius. Accordingly they have a tendency to displace or spread the product inwardly as well as to form an advancing wave therein and to advance the product itself. The scraper blades 75 and 78, it will be observed, move in annular zones and engage the product adjacent to the inner and outer walls 70 and 71. In order to operate upon the product between these zones in somewhat overlapping zones on certain plates 20 some of the arms 65 are provided with a drag scraper 80 of the same shape as that already described and connected to the arm by means of one or more adjustable turn buckle rods 81.

Figures 9, 10:
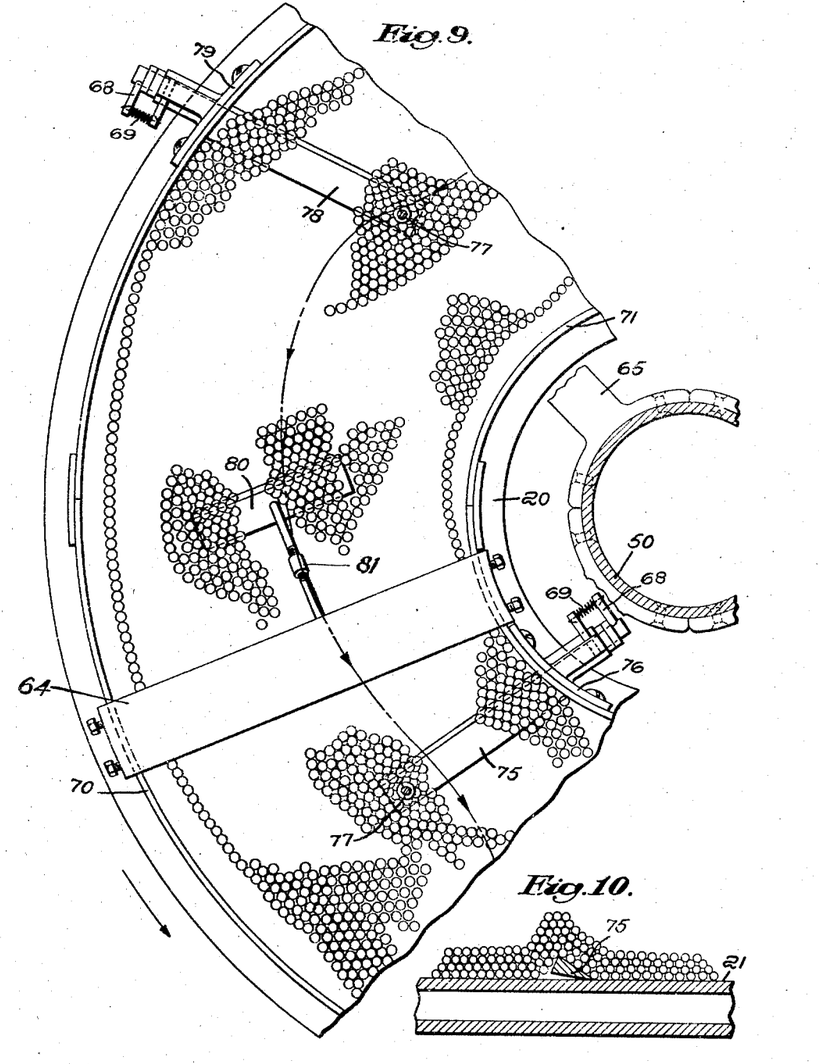
Fig. 9 is a fragmentary plan view showing the disposition of the product upon one of the refrigerating plates.
Fig. 10 is a fragmentary sectional view suggesting the wave formed by the action of one of the scrapers in passing through the product.

While in most instances the wave-forming scraper blades may be carried by the radial arms 65, and are so shown, I contemplate the provision of separate bridge members for this purpose wherever desirable. Such a bridge member 64 is shown in Fig. 9, being clamped to the movable walls 70—71 and carrying the scraper blade 80 by means of the rod 81.

Figure 12:
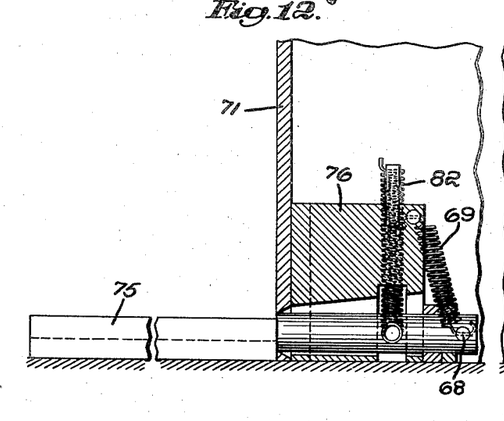
Figs. 12 and 13 are detail views illustrating the mounting of the scrapers.
Figure 13:
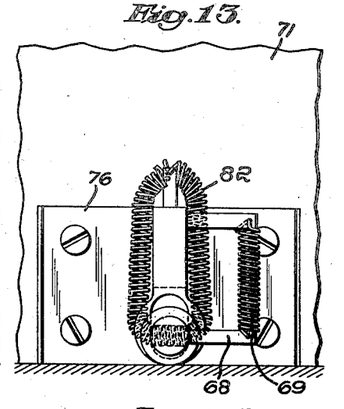
Figures 14, 15, 16, 17, 18:
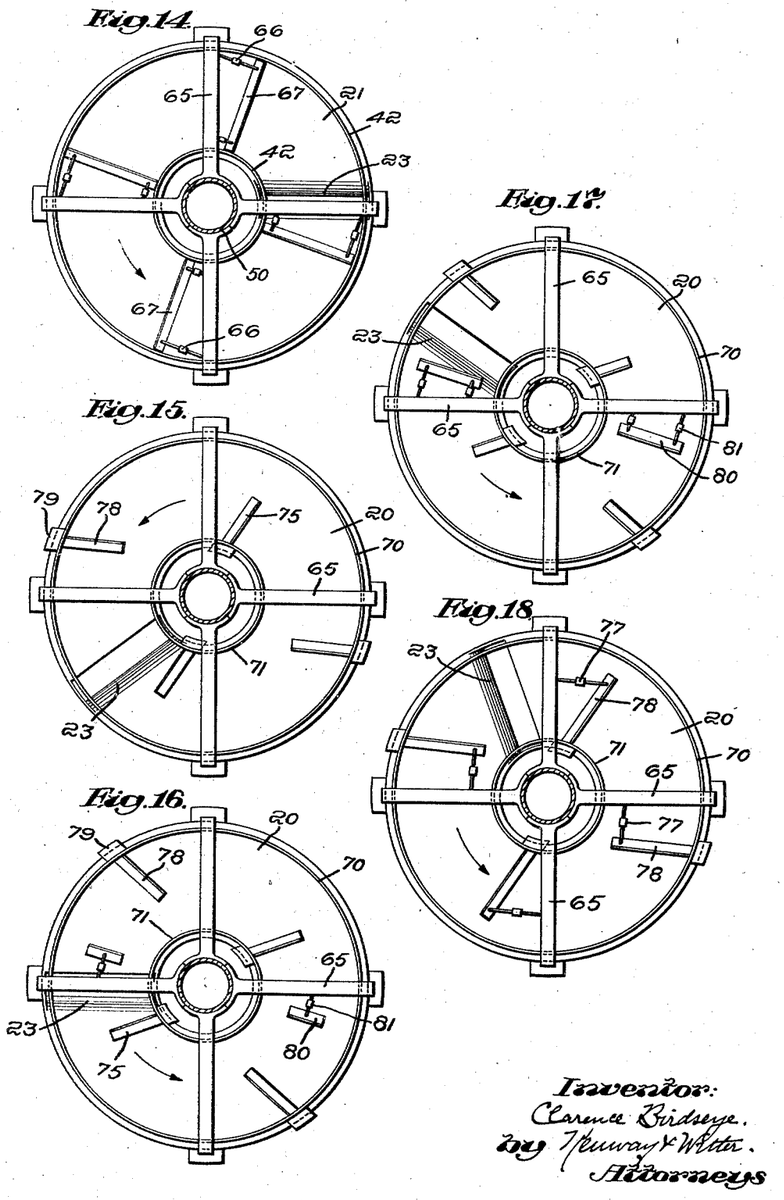
Figs. 14 to 18 are a series of plan views showing various refrigerating plates with different equipments of scrapers.

In Figs. 14–18 I have suggested various combinations of spreading and scraping equipment for the various plates of the apparatus. It will be understood that this equipment may be varied according to the product being treated and conditions of operation. As illustrated, the uppermost plates 21 as shown in Fig. 14, having the stationary walls 42, are equipped with four long scraping blades 67 each supported from one of the radial arms 65 by a pair of adjustable turn buckle rods 66. These blades extend substantially across the entire refrigerating zone as defined by the walls 42 and are disposed in substantially radial position with respect to the circular freezing zone. In Fig. 15 one of the lower plates 20, which may be the fourth plate from the top in the series, is shown as provided with movable walls 70 and 71 arranged to be rotated by the radial arms 65. The outer wall is provided with a pair of inwardly projecting scraper blades 78, and approximately 90° therefrom the inner wall is provided with outwardly projecting scraper blades 75. In this arrangement the blades 75 and 78 overlap in their zones of movement and are preferably mounted as shown in Figs. 12 and 13.

As already explained all of these blades are set at a rearward inclination to a radius at their point of support so that they tend to shift the product toward the center of the freezing zone. The blades 75 and 78 in Figs. 15, 16, and 17 are shown without support at their free ends, it being understood that this is an optional feature desirable in relatively long scraper blades and not required in connection with shorter blades. Fig. 16 discloses the same arrangement as Fig. 15 with the addition of short drag blades mounted upon the arms 65 through the medium of single adjustable turn buckle rods 81. Fig. 17 differs only from Fig. 16 in showing drag scrapers 80 somewhat longer than those shown in Fig. 16 and carried by a pair of turn buckle links 81 instead of a single link. The arrangement of the scraper blades shown in Fig. 18 is similar to that of Fig. 15 except that the blades 78 are shown as supported on their free ends by adjustable turn buckle rods 77 from the radial arms 65.

The fresh moist food product or other product to be frozen or congealed may be supplied continuously to the uppermost plate through the medium of a supply chute 86 which passes down through the cover of the apparatus and is arranged to discharge upon the top plate 21 in a location removed 320 degrees or more from the discharge opening in that plate. The product may be supplied to the chute 86 by a belt conveyor 88 operating in a duct or casing 87. It will be understood that the product is advanced by the action of the scrapers along the annular treating zone of the uppermost plate 21 until it reaches the discharge opening between the filler blocks 22 and 23. When the product and the congealed moisture scraped from the refrigerated surface reach this opening the mass drops by gravity upon the surface of the second plate 21 and is similarly carried round upon this plate and so on to the third plate 21. Subsequently it is delivered to and treated upon the seven lower refrigerating plates 20, finally passing from the bottom plate downwardly through a discharge chute 84 and a corresponding opening in the horizontal partition 17. The frozen product then passes to a horizontal screw conveyor comprising a casing 90, a shaft 92 and a screw 91, as shown in Fig. 1. The shaft 92 is driven from the bevelled gear 59 on a shaft 52 through a bevelled pinion 94 and sprocket chain connection 93. The horizontal conveyor delivers to a vertical duct 100 containing a screw conveyor 99 having a shaft 98. The shaft 98 is driven through bevelled gears 97 from a shaft 96 having a driving connection with the shaft 95 of the bevelled pinion 94. The frozen product is thus elevated and discharged from the apparatus at a level such as to prevent any danger of syphoning out the cooled vapor within the apparatus.

Figure 11:
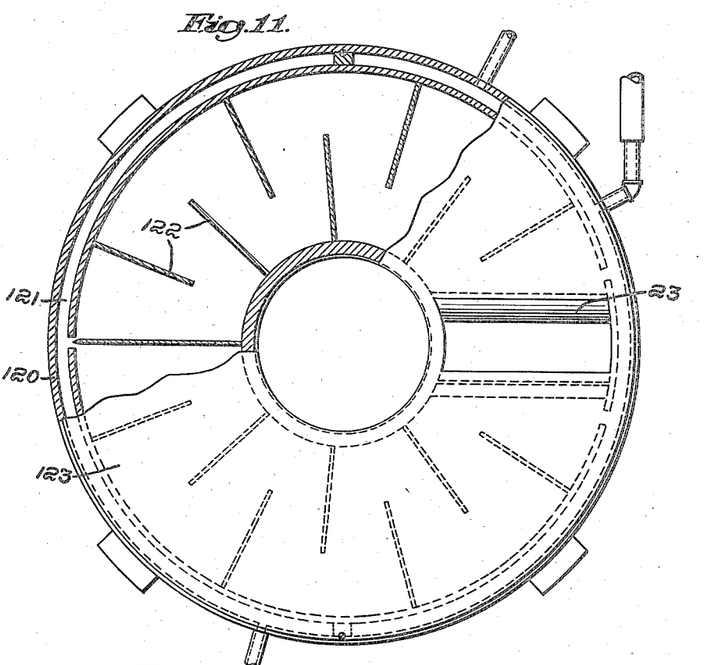
Fig. 11 is a plan view of a refrigerating plate of illustrative construction, a portion being shown as broken away.

An alternative form of refrigerating plate is illustrated in Fig. 11. This plate is so constructed that the connections for the refrigerating medium may be made at substantially any desired points in the circumference of the plate. The body of the plate 120 is provided with a circumferential passage 121 blocked at points 180° apart and having intermediate inlet and outlet ports to the hollow interior of the plate. Radial baffles 122 are provided within the plate for distributing the refrigerating medium and the top or cover section is provided with smooth hard metallic surface as already explained. Supply and outlet connections are suggested in Fig. 11 and it will be apparent that each of these may be located anywhere between the diametrical stops which interrupt the passage 121.

As already suggested, the plates 20—21 may be refrigerated to a temperature of —45° F. or lower by the circulation of brine or by the direct expansion of ammonia therein. The atmosphere within the apparatus, air, $CO_2$ or any desired mixture of gases, is chilled to substantially the same degree, circulated in the spaces between the plates and partially dehydrated by being brought into contact with the refrigerated pipes of the unit 38. The chilled and dehydrated gas may be circulated in the apparatus in any desired path. As already explained that as shown for illustrative purposes is upwardly adjacent to the outer circumference of the plates, inwardly across the product supported upon the plates and downwardly around the shaft 50.

The refrigerating medium may be delivered to the respective plates in accordance with any desired plan. In accordance with one satisfactory arrangement the amount of heat transfer which takes place at each plate is substantially uniform. Consequently the unfrozen or slightly frozen product raises the temperature of the upper plates in the series to a degree somewhat above that of the lower plates in the series. Each plate, however, is substantially colder than the product upon it and the dehydrated gas circulating over the product is always colder than the product with which it is in contact.

Having described the apparatus in some detail the process of treating the product therein will be now discussed. The product may be either a fresh moist food product, such as green peas, oysters, berries or the like having considerable surface moisture or it may be a liquid product such as cream, fruit juice or the like or a combination of the two, such as berries and cream. As it is delivered to the uppermost plates 21 a solid mass of product first piles up beneath the end of the delivery chute 86 and then is spread out by the passage of the arms 65 and the blades 67 through the pile. An infinitesimal layer of ice is formed directly on the surface of the plate between the plate and each unit product touching it. This is immediately removed by action of the scraper blades 67, 75 or 78 which as already explained move with their sharp edges in contact with the surface of the plate, or at heat pressed firmly toward it, and separate the film of ice from the plate without damage to the product. In passing through the mass of product each blade 67 produces a wave which travels ahead at the same rate of speed as the blades and the resultant action of the blades is to set up in the whole mass of product an intermittent advancing motion, but at a considerably slower rate than the rate of wave movement. In dealing with a solid product the individual particles become congealed upon that part of their surface which first touches the plate and in the continued movements of the scrapers they are removed from and returned again and again to contact with the plate in different positions so that eventually they present a dry frozen surface having little or no tendency to stick to the refrigerating plates or to other units of the product.

In the case of liquid products the frozen film is removed from the plate surface and returned to the body of the product, being at first remelted in the mass but eventually chilling it and transforming it to the condition of a wet mush. In passing about the treating zones of the three uppermost plates 21 the product is moved between the stationary walls 42, but when it drops from the third to the fourth plate it is confined to movement between the revolving walls 70 and 71. By this time the surface condition of the product is such that it does not stick to the refrigerating surface nor is there present an excess of free liquid. Upon these surfaces provision is therefore made for shifting the product laterally as well as advancing it. Thus an increased degree of surface contact is brought about between the partially frozen product and the refrigerating plates. The desired movement, as already pointed out, is secured by the cooperative effect of the inner scraper blades 75 which tend to displace the product outwardly, the outer scraper blades 78 which tend to displace the product inwardly, and the intermediate scraper blade 80 which to some extent overlaps the inner and outer zones of activity and tends, in general, to advance the product in a circumferential path. The resultant movement imparted to the product is one of circumferential intermittent advance combined with a transverse or lateral weaving motion.

The product has been described as being advanced upon the refrigerated surfaces of the apparatus in direct contact therewith and the sharp edged members as moving in direct contact with the surfaces, but it will be understood that the presence of a film of ice or frost does not interfere with the successful carrying out of the process. The term "wall" is used herein to designate broadly all circumferential members or walls which define the product-freezing areas upon the refrigerated plates and such walls may be either stationary or movable. The terms in question should therefore be construed herein with corresponding latitude.

The present application contains claims broadly covering the apparatus disclosed in my said copending application, Serial No. 221,041.

Having thus disclosed my invention and described a preferred embodiment thereof for illustrative purposes, but not in any limiting sense, I claim as new and desire to secure by Letters Patent:

1. In apparatus for freezing food products, the combination of a member having a flat refrigerated surface, and means for spreading over said surface a shallow layer of food product, for advancing said product along and in direct contact with said surface and for simultaneously removing congealed moisture from said surface.

2. An apparatus as defined in claim 1, including walls confining the product within a definite freezing area on the refrigerated surface, and means for advancing said walls simultaneously with the means employed for removing congealed moisture from said surface.

3. In a quick freezing apparatus, the combination of a stationary member having a refrigerated surface, forwardly moving walls delimiting both edges of a freezing zone extending longitudinally of said surface, and product-advancing means actuated by the movement of the said walls.

4. In an apparatus for freezing food products, the combination of a heat conductive metal plate having a flat product-supporting face, stationary side walls along the outer edges of said face, an arm operating in the space between said side walls and above said face, and means actuated by said arm for moving products over said face within the enclosed space.

5. In a quick-freezing apparatus, the combination of a series of flat horizontally disposed refrigerating surfaces, and means for spreading a food product in layers on said surfaces and for removing from said surfaces congealed moisture and at the same time advancing the food product intermittently along said surfaces.

6. Refrigerating apparatus including in its structure a series of communicating refrigerating plates provided with openings through which a food product may fall from one to another and with spaced walls defining product-treating zones thereon, and means for advancing the walls on certain of said plates to cause the product adjacent to the walls to advance on the plates.

7. Refrigerating apparatus including in its structure a series of communicating refrigerating plates provided with openings through which a food product may fall from one to another and with spaced walls defining product-treating zones thereon, the walls on certain plates being movable along said freezing zone to facilitate movement of the product thereon and the walls on certain other plates being stationary.

8. Refrigerating apparatus including in its structure a series of communicating refrigerating plates provided with openings through which a food product may fall from one to another and with spaced walls defining product-treating zones thereon, means for delivering a moist food product to the uppermost plate of the series, means for holding stationary the walls upon those plates to which the product is first delivered, and means for advancing the walls upon those plates to which the product is subsequently delivered.

9. Refrigerating apparatus including in its structure a series of communicating refrigerating plates provided with openings through which a food product may fall from one to another and with spaced walls defining product-treating zones thereon, scrapers associated with said plates, and means for moving the walls and scrapers on certain plates, and the scrapers alone on certain other plates.

10. In a quick freezing apparatus, the combination of a flat heat conductive plate, and a means for spreading a mass of moisture-containing product in a substantially uniform layer over said plate, said means being shaped also for progressively lifting the product from the plate and thereby creating in the layer of product a series of ripples all advancing along the product on the plate and all at the same rate of speed.

11. Freezing apparatus for food products, including a heat insulating casing enclosing a series of spaced hollow plates having aligned openings therein, and flat product-supporting faces, means for delivering a moisture containing product to the uppermost plate of the series, means for supplying a refrigerating medium to the plates, a hollow shaft extending through the openings in the plates and adapted to contain a refrigerant, means for circulating refrigerating gas over the plates and the product thereon, and means actuated by the shaft for advancing the product upon the plates.

12. Freezing apparatus for food products, including a heat insulating casing enclosing a series of spaced refrigerated plates, means for advancing a product across the plates, and means for supporting the plates substantially independently of the casing, whereby the latter may be removed temporarily without disturbing said plates.

13. In a freezing apparatus, a refrigerated plate having a horizontal flat surface for supporting a food product to be frozen, parallel walls confining the product to a definite freezing zone, and a metallic, sharp-edged member movable across said plate to remove congealed moisture therefrom and to mix it with said product and having yielding means for holding its edge in intimate contact with the surface of the plate.

14. In a freezing apparatus, a refrigerated member having a flat product-supporting face, a blade-carrier movable adjacent to said face, a metallic blade extending across said face and rotatably mounted in said carrier, and means tending at all times to swing the blade in a direction holding its edge in contact with said face.

15. In freezing apparatus, a refrigerated member having a flat product-supporting face bounded by movable parallel walls, and spaced sharp-edged scrapers extending inwardly from said walls and actuated by the movement thereof and being of such length as to overlap in their effective zones.

16. In freezing apparatus, a refrigerated member having a flat product-supporting face bounded by spaced walls, means for moving the walls in parallel paths, scrapers movable in zones adjacent to said walls and actuated by the movement of the walls, and a supplementary scraper movable on said surface in a zone spaced from both walls.

17. Freezing apparatus comprising heat insulating casing, a supporting frame within the casing, a series of flat refrigerated plates mounted in said frame for individual adjustment, whereby each plate may be independently leveled within the casing, and means maintained in yielding contact with the surfaces of said plates for advancing a food product thereon.

18. In a freezing apparatus, a series of refrigerating plates having flat product-supporting faces and product-discharging openings, product moving means pressed resiliently against said surface, each opening presenting at one edge a smooth upwardly curved surface adapted to lead said product moving means to its flat face.

19. In a freezing apparatus, a circular refrigerated plate having a horizontal flat surface for supporting a food product to be frozen, and a metallic sharp-edged member movable across the plate to remove congealed moisture therefrom with its sharp edge held yieldingly in intimate contact with the upper surface of the plate, and power operated mechanism for advancing said member at a uniform rate.

20. In a freezing apparatus, a series of refrigerated plates each having a flat product supporting face and an opening through which product may fall from one plate to the next in the series, means for circulating a refrigerated gas into the space above each plate, and on each plate a metallic sharp-edged member substantially wedge-shaped in cross section having an inclined upper face and being movable across the plate to remove congealed moisture therefrom and at the same time to lift portions of the product upwardly from contact with the plate into position where they are exposed to the refrigerated gas and simultaneously mixing congealed moisture removed from the plate with the product.

21. In a food freezing apparatus, the combination of a refrigerated plate having a flat heat-conductive surface for supporting a mass of food product thereon, product-advancing means for passing the product along and in direct contact with said face, and means for circulating a partially dehydrated gas over said face, the product-advancing means being shaped to stir the mass of product and cause individual units thereof to move into and out of contact with the refrigerated face and into and out of the current of the gas.

22. In an apparatus for freezing surface-wet food units, the combination of a refrigerated plate having a flat surface to which the moisture on the outer surfaces of the food units freezes, a sharp-edged instrument, and means for passing the same through the congealed moisture between the refrigerated surface and the food units without cutting the latter and for moving the units of the mass intermittently along the refrigerated surface.

23. Refrigerating apparatus including in its structure a series of superposed spaced refrigerating plates having staggered openings whereby the product to be frozen may pass from plate to plate, each plate being provided with spaced walls defining product-treating zones thereon, and means for advancing the walls on certain of said plates.

24. In freezing apparatus, a refrigerated member having a flat product-supporting face bounded by movable parallel walls, and spaced sharp-edged scrapers actuated by and extending inwardly from said walls and being of such length as to overlap in their effective zones.

25. In freezing apparatus, a refrigerated member having a flat product-supporting face bounded by spaced walls, sharp-edged scrapers movable in zones adjacent to and actuated by said walls, and a supplementary scraper movable on said surface in a zone spaced from both walls.

26. In a freezing apparatus, a hollow annular plate having a flat product-supporting face and spaced substantially parallel internal walls forming an internal chamber for a refrigerant and a circumferential passage opening into said internal chamber to supply inlet and outlet connections therewith.

27. In a freezing apparatus, a refrigerated plate having a flat surface for supporting a product to be frozen, and a sharp-edged member movable across said plate to remove congealed moisture therefrom and shaped to lift the product from the plate and to impart an intermittent forward motion to the product while so lifted.

28. In apparatus for freezing food products, the combination of a member having an annular flat refrigerated surface bounded by circular walls, means for spreading over said surface a shallow layer of food product, and means for advancing said product along and in direct contact with said surface and for simultaneously removing congealed moisture therefrom, said product-moving means extending transversely of the freezing surface and at an angle to the radius of the circular walls bounding the freezing zone.

29. In a quick freezing apparatus, the combination of a series of spaced refrigerated plates having product-supporting faces, an enclosing casing for the plates, means for advancing the product along and in direct contact with the faces of said plates, means for circulating a refrigerated gas over said plates, and means for preventing the unobstructed passage of the refrigerated gas from the apparatus.

30. Refrigerating apparatus including in its structure a series of communicating refrigerating plates provided with openings through which a food product may fall from one to another and with spaced walls defining product-treating areas thereon, means for advancing certain of the walls upon the plates, and a secondary product-confining wall located on the freezing surface outside the spaced walls on at least one of the refrigerating plates.

31. Freezing apparatus including in its structure a series of freezing plates disposed one above another and having spaced circumferential walls defining freezing surfaces on each plate, means for delivering to an upper freezing plate of the series a product to be frozen, means for moving the product upon said freezing surfaces of the respective plates and for transferring it from plate to plate, and means for refrigerating the plates.

32. Freezing apparatus having a casing, a series of freezing plates arranged therein one above another and having spaced circular flanges, certain of the plates being provided with discharge openings extending from flange to flange, and means for pushing a product to be frozen across the surface of the several plates between said flanges and into the discharge opening therein, out of contact with the casing.

33. Freezing apparatus having a normally closed casing containing a series of stationary freezing shelves, means for moving a food product on the shelves so that it may be transferred by gravity from one shelf to another, means for supplying a gaseous refrigerating medium in the casing, and means for conducting the frozen product from the bottom of the casing and discharging it substantially at the level of the top of the casing.

34. A freezing apparatus comprising a series of spaced superposed stationary refrigerating plates with staggered openings therein, means for continuously delivering an unfrozen product to an upper plate in the series, means for causing the product to advance from plate to plate through such openings whereby it becomes frozen, and means for continuously elevating the frozen product from the lower part of the apparatus outside the refrigerating plates.

35. Freezing apparatus including a closed casing, a series of stationary spaced refrigerated plates located therein at different levels, means for advancing a product along the surface of said plates, and means for supplying an inert gas to the interior of the casing so that the product may be frozen without oxidization.

36. Freezing apparatus including in its structure an outer insulating casing enclosing superposed flat refrigerating plates with spaces between them, means for delivering to an upper plate of the series a product to be frozen, movable means for causing the product to pass around and in contact with the plates, the latter being provided with openings allowing the product to fall from one plate to the next when the product is pushed into the opening, the product moving means being constructed and arranged to move the product under evenly distributed condition upon the refrigerated surface of each plate in the series while it is being advanced thereon.

37. Freezing apparatus including in its structure a normally closed casing containing a series of stationary freezing shelves arranged one above another with spaces between them and having openings whereby the product may fall from one plate to the next, means for moving the product to be frozen along the surface of said plates and into said openings, means for supplying a gaseous refrigerating medium within the casing and in contact with the product on the freezing shelves, and means for conducting the frozen product from the bottom of the casing and discharging it at a point not lower than the level of the top of the casing.

38. In a quick-freezing apparatus, a series of refrigerated plates spaced one above another and having openings in staggered relation, means for delivering a moisture-containing product to an upper plate of the series, and sharp-edged members constructed and arranged to travel along the refrigerated surfaces of the several plates to remove congealed moisture therefrom and to advance the product, mixed with said congealed moisture, to the openings in the plates whereby the mixture may fall from one plate to the next.

CLARENCE BIRDSEYE.